(12) United States Patent
Hoffer et al.

(10) Patent No.: US 9,180,533 B2
(45) Date of Patent: Nov. 10, 2015

(54) ROUND CUTTING INSERT WITH SERRATED TOPOGRAPHY

(71) Applicant: Kennametal Inc., Latrobe, PA (US)

(72) Inventors: Brad Daniel Hoffer, White, PA (US); Thomas Jerry Long, II, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 282 days.

(21) Appl. No.: 13/761,241

(22) Filed: Feb. 7, 2013

(65) Prior Publication Data

US 2014/0219734 A1 Aug. 7, 2014

(51) Int. Cl.
*B23C 5/02* (2006.01)
*B23C 5/20* (2006.01)
*B23C 5/00* (2006.01)

(52) U.S. Cl.
CPC ............... *B23C 5/207* (2013.01); *B23C 5/003* (2013.01); *B23C 2200/045* (2013.01); *B23C 2200/086* (2013.01); *B23C 2200/125* (2013.01); *B23C 2200/206* (2013.01); *B23C 2250/16* (2013.01); *Y10T 29/49826* (2015.01); *Y10T 407/1924* (2015.01); *Y10T 407/20* (2015.01); *Y10T 407/245* (2015.01); *Y10T 409/303752* (2015.01)

(58) Field of Classification Search
CPC .. B23C 5/207; B23C 5/003; B23C 2200/045; B23C 2200/086; B23C 2200/125; B23C 2200/206; B23C 2250/15
USPC ............. 407/42, 55, 58, 61, 62, 64, 113, 114, 407/115, 116; 409/131, 132
See application file for complete search history.

(56) References Cited

U.S. PATENT DOCUMENTS

| 668,195 | A | | 2/1901 | Lange | |
|---|---|---|---|---|---|
| 2,178,589 | A | * | 11/1939 | Kraus | 409/228 |
| 3,636,602 | A | | 1/1972 | Owen | |
| 3,875,631 | A | * | 4/1975 | Malinchak | 407/113 |
| 4,626,140 | A | * | 12/1986 | Zweekly et al. | 407/114 |
| 4,794,665 | A | | 1/1989 | Peters | |
| 5,028,175 | A | * | 7/1991 | Pawlik | 407/40 |
| 5,085,542 | A | | 2/1992 | Nakayama et al. | |

(Continued)

FOREIGN PATENT DOCUMENTS

| JP | 2006192567 A | * | 7/2006 |
| JP | 2006218617 A | * | 8/2006 |
| JP | 2007210090 A | * | 8/2007 |

OTHER PUBLICATIONS

JP 2007-210090's Machine Translation, Jun. 30, 2006.*

*Primary Examiner* — Daniel Howell
*Assistant Examiner* — Nicole N Ramos
(74) *Attorney, Agent, or Firm* — Larry R. Meenan

(57) ABSTRACT

A cutting insert with a serrated topography includes a top surface terminating in a circular cutting edge, a bottom surface and a frusto-conical sidewall interconnecting the top surface and the bottom surface, and a plurality of serrations on the top surface uniformly disposed around the circular cutting edge and extending radially inward from the cutting edge in such a way that a bisector through each serration passes through a central axis of the cutting insert. The plurality of serrations are positioned in a cutting tool in such a way so as to reduce regenerative chatter during a cutting operation. A method of reducing generative chatter by positioning the cutting inserts in a particular fashion in a cutting tool is also disclosed.

7 Claims, 4 Drawing Sheets

(56) References Cited

U.S. PATENT DOCUMENTS

| | | | |
|---|---|---|---|
| 6,152,658 A * | 11/2000 | Satran et al. | 407/103 |
| 6,447,218 B1 * | 9/2002 | Lagerberg | 407/114 |
| 6,913,426 B2 * | 7/2005 | Horiike et al. | 407/113 |
| 7,008,145 B2 | 3/2006 | Astrakhan | |
| 7,993,082 B2 * | 8/2011 | Horiike et al. | 407/113 |
| 8,113,746 B2 | 2/2012 | Koga | |
| 8,231,311 B2 | 7/2012 | Ballas et al. | |
| 8,734,062 B2 * | 5/2014 | Henry et al. | 407/11 |
| 2002/0159846 A1 * | 10/2002 | Horiike et al. | 407/114 |
| 2003/0235475 A1 * | 12/2003 | Chung Tong | 407/114 |
| 2007/0059112 A1 * | 3/2007 | Nudelman | 407/117 |
| 2010/0092253 A1 | 4/2010 | Ishida | |

* cited by examiner

ROUND CUTTING INSERT WITH SERRATED TOPOGRAPHY

BACKGROUND OF THE INVENTION

The invention relates in general to a cutting insert that may be detachably mounted on a tool holder for cutting a workpiece, and in particular to a cutting insert with a serrated topography that reduces or eliminates regenerative chatter during a cutting operation, while also reducing tool pressure.

In conventional round cutting inserts, regenerative chatter is caused by repetition of the cutting edges that creates a frequency during a cutting operation. This regenerative chatter may cause premature insert wear and failure, as well as a poor quality surface finish.

SUMMARY OF THE INVENTION

The problem of regenerative chatter is solved by providing a cutting insert having a top surface with a plurality of serrations extending radially inward from the cutting edge.

One purpose of the serrations of the invention is to break up the repetition of the cutting edges, thereby disrupting the frequency. This is accomplished by rotating the serrations in the cutter body of a cutting tool in a particular fashion. The serration position of the first cutting insert is at zero (0) degrees. The serration position of the second cutting insert is rotated ½ of 360 degrees divided by the total number of serrations (which can vary depending of the design) with respect to the first cutting insert. The serration position of the third cutting insert is rotated ¼ of 360 degrees divided by the total number of serration with respect to the first cutting insert.

The positions will vary depending on the number of pockets in the cutter body of the cutting tool. It is noted that the serration position of the third cutting insert will only be used on cutter bodies with an odd number of pockets. Another way to express these different serration positions would be to call it a phase shift/out of phase of the waves due to the serrated cutting edges.

In one aspect of the invention, a cutting insert with a serrated topography, comprises a top surface terminating in a circular cutting edge, a bottom surface and a frusto-conical sidewall interconnecting the top surface and the bottom surface; and a plurality of serrations uniformly disposed on the top surface and extending radially inward from the cutting edge in such a way that a bisector through each serration passes through a central axis of the cutting insert, wherein the plurality of serrations reduce regenerative chatter during a cutting operation.

In another aspect of the invention, a method of reducing regenerative chatter in a cutting tool having a plurality of cutting inserts with a plurality of serrations on a top surface of the cutting insert, the method comprising:
 positioning a first cutting insert of the plurality of cutting inserts at a first serration position of 0 degrees; and
 positioning a second cutting insert of the plurality of cutting inserts at a second serration position by rotating the second cutting insert with respect to the first cutting insert ½ (360/(the total number of serrations)) degrees.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
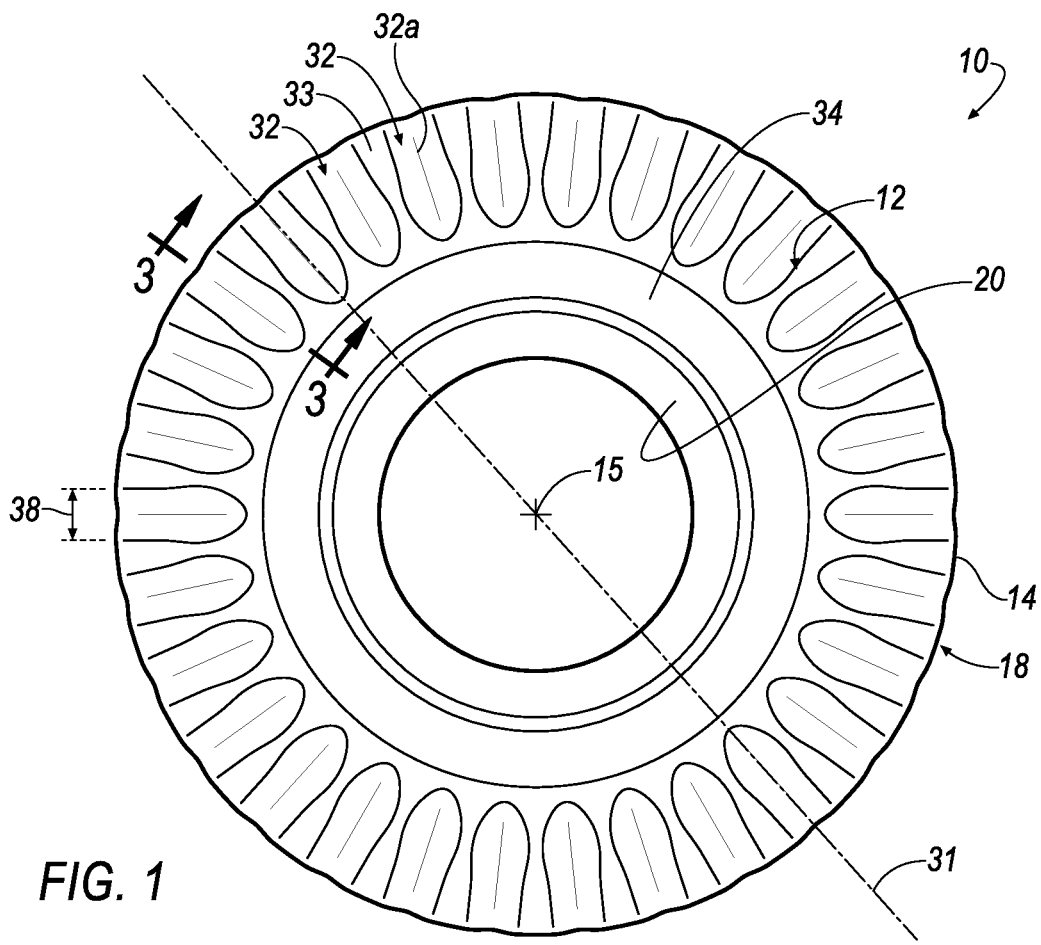
FIG. 1 shows a top view of a round cutting insert with a serrated topography according to an embodiment of the invention.
Figure 2:
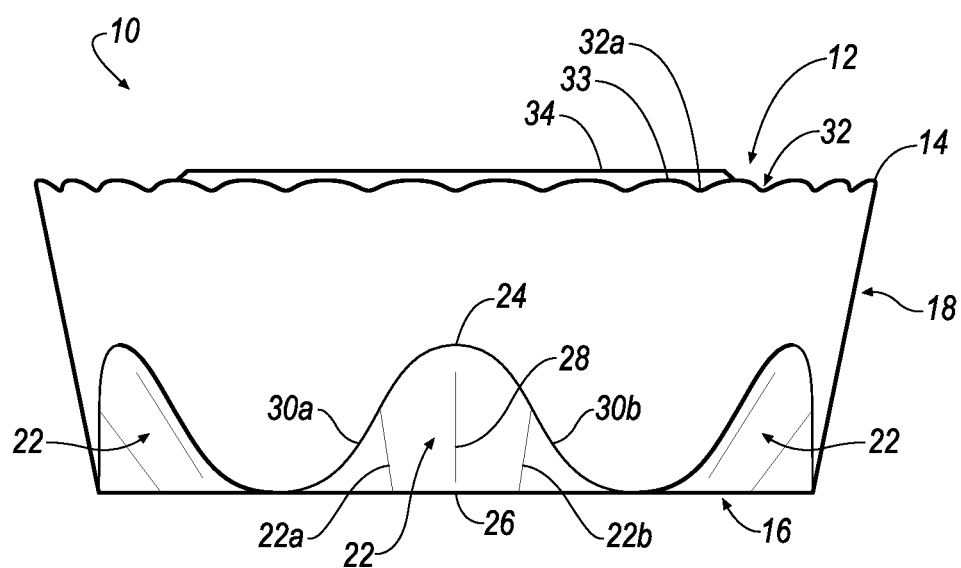
FIG. 2 shows a side view of the cutting insert of FIG. 1.
Figure 3:
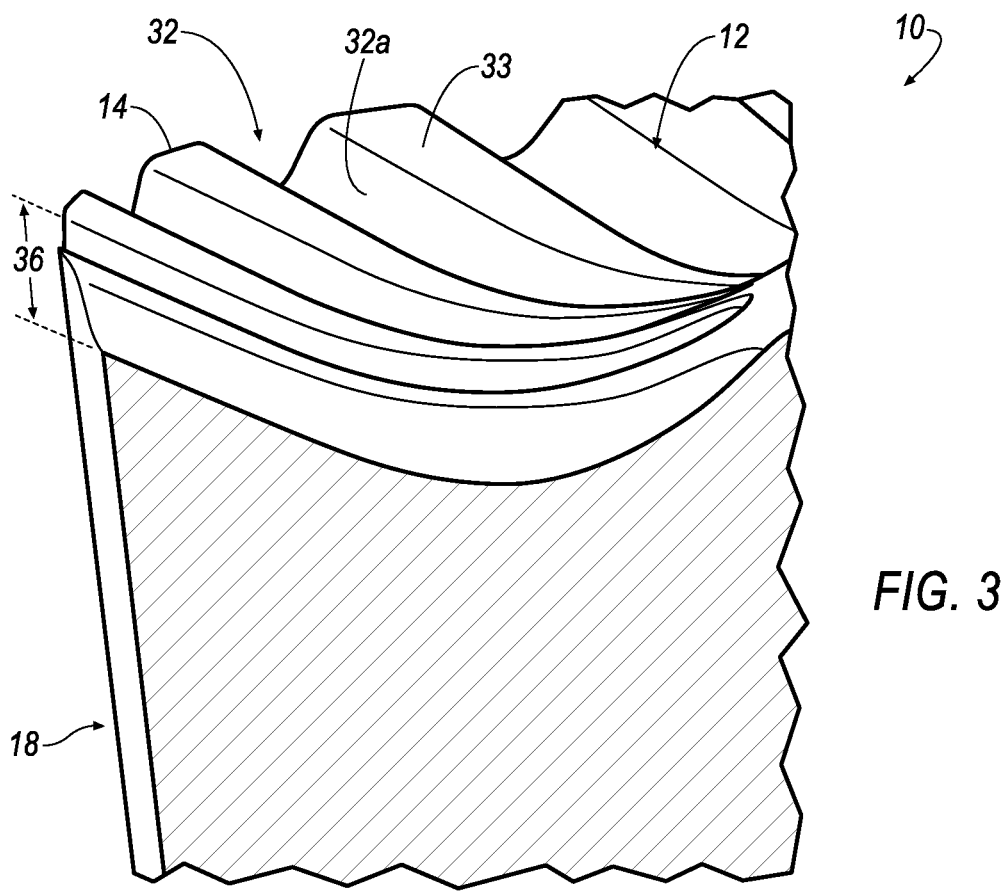
FIG. 3 shows a cross-sectional view of the cutting insert taken along line 3-3 of FIG. 2.

Referring now to FIGS. 1-3, a round cutting insert 10 is shown according to an embodiment of the invention. In general, the insert 10 has a top surface 12 that terminates in a circular cutting edge 14, a central axis 15, and a bottom surface 16 that engages a floor of a pocket when the insert 10 is mounted onto a cutter body of a cutting tool (not shown). The top surface 12 acts as a rake surface during a cutting operation. The insert 10 further has a frusto-conical sidewall 18 interconnecting the top surface 12 and bottom surface 16. A screw hole 20 is centrally disposed through the body of the insert 10 for receiving a threaded shank of a clamping screw (not shown).

A plurality of curved stop surfaces 22 are uniformly disposed around the frusto-conical sidewall 18 of the insert 10. Each of the curved stop surfaces 22 in the sidewall 18 of the insert 10 includes a pair of mirror-symmetrical oblique engagement portions 22a, 22b for forming an interference-type joint with a substantially complementarily-curved anti-rotation surface on the pocket of the cutter (not shown). This interference-type joint formed between the stop surfaces 22 and the anti-rotation surface on the pocket forms an anti-rotation mechanism to prevent rotation of the cutting insert 10 in the pocket.

The upper and lower limits of each stop surface 22 is defined by a top end 24, and a bottom end 26. The central portion 28 of each stop surface 22 is gently tapered so that the depth of the stop surface 22 gently increases between the top and bottom ends 24, 26. Such tapering advantageously reduces the amount of material that must be removed from the body of the insert 10 in order to form the stop surfaces 22. Finally, each of the stop surfaces 22 is defined by side edges 30a, 30b formed by mirror-symmetrical S-type curves between top and bottom ends 24, 26 of each surface 22. Due to the uniform sizing and angular spacing of the stop surfaces 22, a combination of the mirror-symmetrical S-curves forming the side edges 30a, 30b of the stop surfaces 22 creates a continuous sinusoidal curve around the circumference of the sidewall 18 of the insert 10.

One aspect of the invention is that the topography of the top surface 12 comprises a plurality of serrations, shown generally at 32, on the top surface 12 that extend radially inward from the cutting edge 14 in such a way that a bisector 31 through each serration 32 passes through the central axis 15 of the cutting insert 10. Each serration 32 is separated by a substantially planar land surface 33. In the illustrated embodiment, the serrations 32 are uniformly disposed around the circular cutting edge 14 forming an annular arrangement when the cutting insert 10 is viewed from the top, as shown in FIG. 1. In one embodiment, the serrations 32 extend from the cutting edge 14 to a substantially planar, annular-shaped surface 34 adjacent the screw hole 20. It is noted that the annular-shaped surface 34 may be slightly higher in elevation than the cutting edge 14 and the serrations 32, as shown in FIG. 2. In the illustrated embodiment, the profile shape of each serration 32 is substantially identical to each other. However, it is possible that the serrations 32 may not be identical to each other in profile shape.

Referring now to FIG. 3, each serration 32 has a curved bottom surface 32a having a depth 36 with respect to the annular-shaped surface 34 that gradually increases from the cutting edge 14 to the surface 34. In addition, each serration 32 has a width 38 that is greatest proximate the cutting edge 14 and gradually decreases from the cutting edge 14 to the surface 34, as shown in FIG. 2.

In conventional round cutting inserts, regenerative chatter is caused by the same identical repetition of the cutting edges of the cutting inserts mounted in the pockets of the cutting tool that creates a frequency during a cutting operation. One purpose of the serrations 32 of the invention is to break up the repetition of the cutting edges 14, thereby disrupting the frequency caused by the repetition of the cutting edges during a cutting operation. This is accomplished by positioning the serrations 32 on the cutting inserts 10 in the pockets of the cutting tool in a particular fashion. The position of the first cutting insert 10 (first serration position) is at zero (0) degrees. The second cutting insert 10 (second serration position two) is rotated ½ of 360 degrees divided by the total number of serrations 32 with respect to the first cutting insert 10 (which can vary depending of the design). The third cutting insert 10 (third serration position) is rotated ¼ of 360 degrees divided by the total number of serrations 32 with respect to the first cutting insert 10.

The positions of the cutting inserts 10 will vary depending on the number of pockets of the cutter. The third serration position will only be used on cutter bodies with an odd number of pockets. Thus, the order will be the first serration position, followed by the second serration position, and so on, for cutter bodies with an even number of pockets. Likewise, the order will the first serration position, followed by the second serration position, and then followed by the third serration position, and so on, for cutter bodies with an odd number of pockets.

Figure 4:
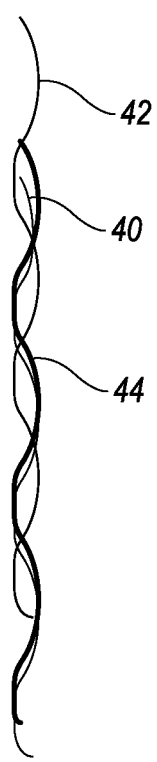
FIG. 4 shows a schematic view of the waves by rotating the serrated cutting edges of the cutting insert of FIG. 1 in the first, second and third serration positions as viewed by the workpiece according to the invention.
Figure 5:
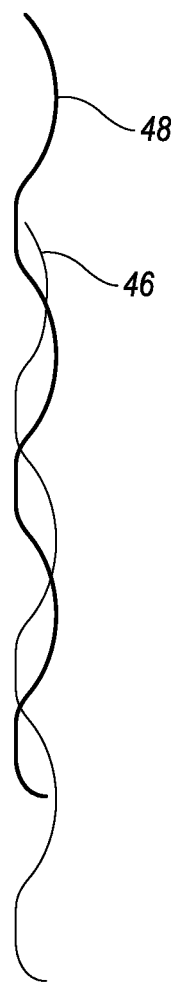
FIG. 5 shows a schematic view of the waves by rotating the serrated cutting edges of the cutting insert of FIG. 1 in the first and second serration positions as viewed by the workpiece according to the invention.
Figure 6:
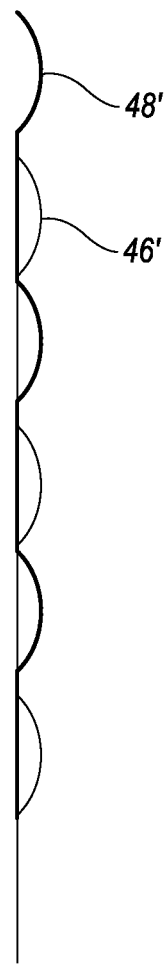
FIG. 6 shows a schematic view of the waves by rotating the serrated cutting edges of the cutting insert with smooth walls in the first and second serration positions as viewed by the workpiece according to the invention.

Another way to express these different serration positions would be to call them a phase shift/out of phase of the waves due to the serrated topography of the cutting insert 10. These waves of the serrated cutting edge 14 on the cutting inserts 10, when viewed with respect to the workpiece, are shown in FIGS. 4-6.

In one example, suppose the cutting insert 10 in the illustrated embodiment has a total number of thirty (30) serrations 32 and is mounted in a cutter body with an odd number of pockets. As shown in FIG. 4, the first serration position is at 0 degrees, the second serration position is rotated ½ (360/30) with respect to the first cutting insert 10, which is equal to six (6) degrees, the third serration position is rotated ¼ (360/30) with respect to the first cutting insert 10, which is equal to 3 degrees. The waves 40, 42, 44 for the first, second and third serration positions, respectively, is shown in FIG. 4. It will be appreciated that the third position would be repeated for a cutting body with an odd number of insert pockets greater than three, for example, five, seven, nine, and the like. These different rotations of the cutting inserts 10 with respect to each other in the pockets break up the repetition of the cutting edges 14, and therefore disrupt the frequency that produces regenerative chatter.

In another example, suppose the cutting insert 10 in the illustrated embodiment has a total number of thirty (30) serrations 32 and is mounted in a cutter body with an even number of pockets. Then, the first serration position is at 0 degrees, and the second serration position is rotated ½ (360/30) with respect to the first cutting insert 10, which is equal to six (6) degrees. The waves 46, 48 for the first and second serration positions, respectively, is shown in FIG. 5. It will be appreciated that the first and second positions would be repeated for a cutter body with an even number of insert pockets greater than two. FIG. 6 shows the waves 46', 48' for a cutter body with an even number of pockets, but with the cutting insert 10 having serrations 32 with wider lands 33. These different rotations of the cutting inserts 10 break up the repetition of the cutting edges 14, and therefore disrupt the frequency that produces regenerative chatter.

In addition to greatly reducing or eliminating regenerative chatter, another purpose of the serrations 32 in the top surface 12 of the cutting insert 10 of the invention is to reduce tool pressure. This is accomplished by reducing the amount of surface contact between the workpiece and the cutting edge 14 of the insert 10. It has been observed that this reduction in the amount of surface contact will also produce individualized smaller chips instead of one large chip during a cutting operation.

Figure 7:
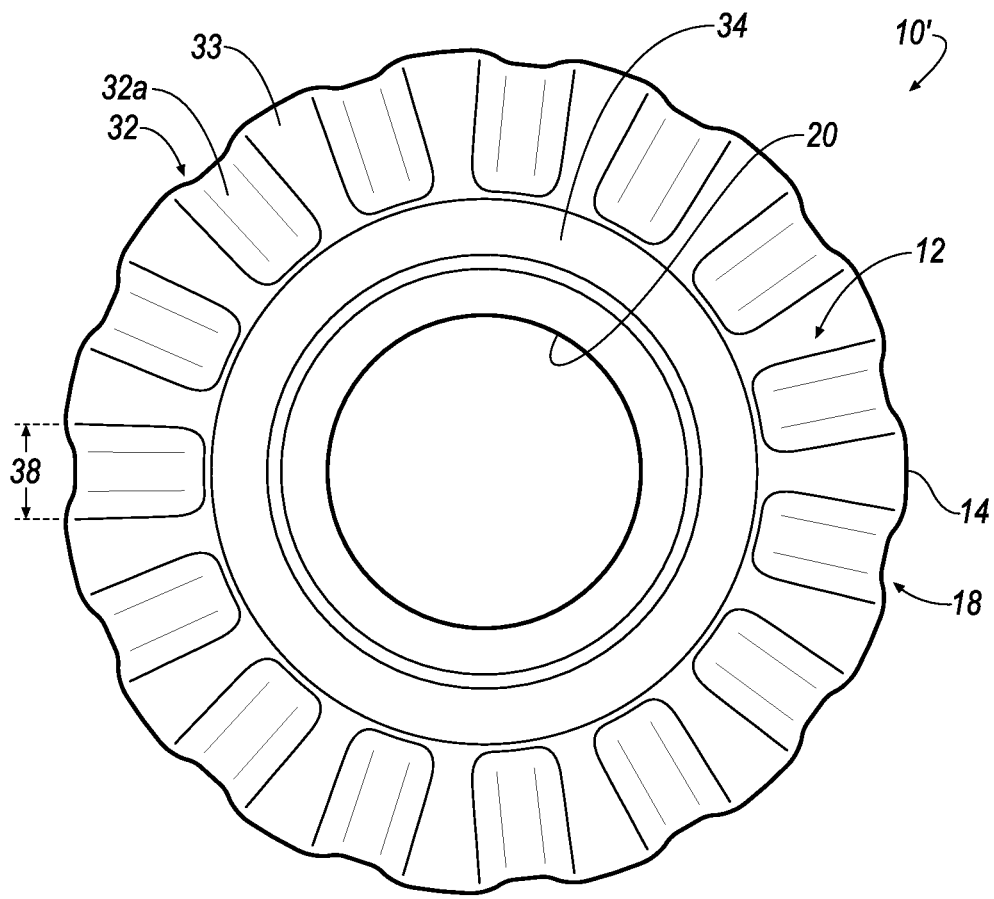
FIG. 7 shows a top view of a round cutting insert with a serrated topography according to another embodiment of the invention.
Figure 8:
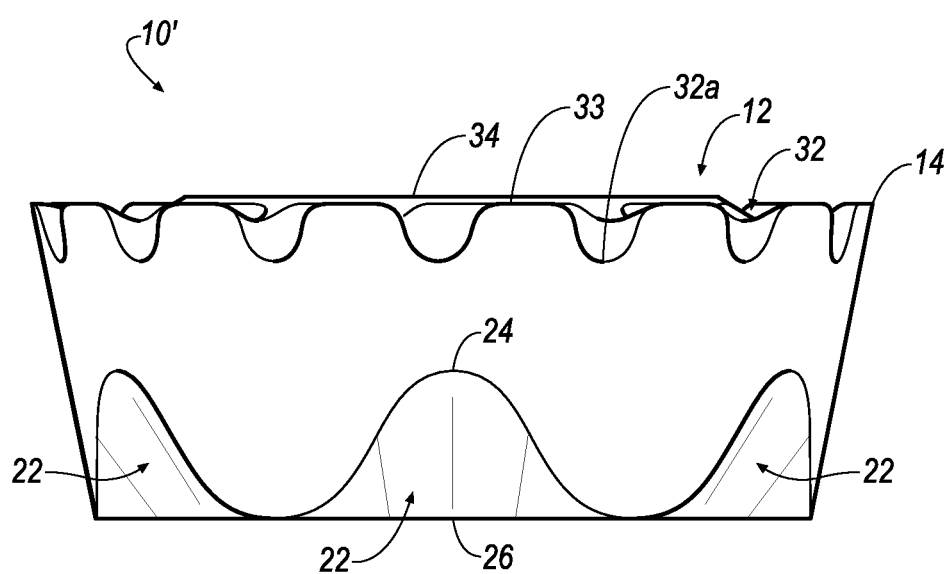
FIG. 8 shows a side view of the cutting insert of FIG. 7.

It will be appreciated that the invention is not limited by a specific profile shape of the serrations 32, and that the principles of the invention can be practiced with serrations having any desired profile shape. Referring now to FIGS. 7 and 8, a cutting insert 10' is shown according to another embodiment of the invention. In this embodiment, the serrations 32 have a greater depth 36 than in the cutting insert 10. In addition, the serrations 32 have a greater width 38 than in the cutting insert 10. As a result, the cutting insert 10' has a fewer total number of serrations 32 than in the cutting insert 10.

The round cutting insert with serrated topography of the invention has distinct advantages when compared to conventional round cutting inserts. For example, the serrations 32 being located on the top surface 12 of the cutting insert 10 of the invention does not require costly machining of the toolholder as compared to conventional round inserts with serrations on the sidewall of the insert. In addition, the minimal contact between the serrated topography of the invention and the chips reduces friction produced during the machining operation. Further, the serrated topography of the invention can by used to provide coolant to the cutting edge.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:
1. A cutting insert with a serrated topography, comprising:
 a top surface terminating in a circular cutting edge, a bottom surface and a frusto-conical sidewall interconnecting the top surface and the bottom surface;

a plurality of serrations uniformly disposed on the top surface and extending radially inward from the cutting edge in such a way that a bisector through each serration passes through a central axis of the cutting insert; and a plurality of curved stop surfaces uniformly disposed around the frusto-conical sidewall and extending to the bottom surface of the insert, wherein each of the curved stop surfaces includes a pair of mirror-symmetrical oblique engagement portions, wherein each of the stop surfaces is defined by side edges formed by mirror-symmetrical S-type curves between top and bottom ends of each surface, wherein a central portion of each the stop surfaces is tapered such that a depth of each of the stop surfaces increases between the top and bottom ends of each surface, and wherein the plurality of serrations reduce regenerative chatter during a cutting operation.

2. The cutting insert according to claim 1, wherein each serration is separated by a substantially planar land surface.

3. The cutting insert according to claim 1, wherein each serration extends radially inward from the cutting edge to a substantially planar, annular-shaped surface on the top surface.

4. The cutting insert according to claim 1, wherein each serration has a curved bottom surface having a depth that gradually increases from the cutting edge to the annular-shaped surface with respect to the annular-shaped surface.

5. The cutting insert according to claim 1, wherein each serration has a width that is greatest proximate the cutting edge and gradually decreases from the cutting edge.

6. A method of reducing regenerative chatter in a cutting tool having a plurality of cutting inserts mounted in an even number of pockets, each cutting insert comprising a top surface terminating in a circular cutting edge, a bottom surface and a frusto-conical sidewall interconnecting the top surface and the bottom surface; and a plurality of serrations disposed on the top surface, the method comprising:

positioning a first cutting insert of the plurality of cutting inserts at a first serration position; and positioning a second cutting insert of the plurality of cutting inserts at a second serration position by rotating the second cutting insert about its central axis ½ (360/(a total number of serrations)) degrees with respect to the first cutting insert, wherein the first and second serration positions are repeated in an alternating fashion for cutting tool having more than two pockets.

7. A method of reducing regenerative chatter in a cutting tool having a plurality of cutting inserts mounted in an odd number of pockets, each cutting insert comprising a top surface terminating in a circular cutting edge, a bottom surface and a frusto-conical sidewall interconnecting the top surface and the bottom surface; and a plurality of serrations disposed on the top surface, the method comprising:

positioning a first cutting insert of the plurality of cutting inserts at a first serration position;

positioning a second cutting insert of the plurality of cutting inserts at a second serration position by rotating the second cutting insert about its central axis ½ (360/(a total number of serrations)) degrees with respect to the first cutting insert; and positioning a third cutting insert at a third serration position by rotating the third cutting insert about its central axis ¼ (360/(a total number of serrations)) degrees with respect to the first cutting insert for cutting tool having an odd number of pockets, wherein the first, second and third serration positions are repeated in an alternating fashion for a cutting tool having more than three pockets.

* * * * *